Figures 1, 4:
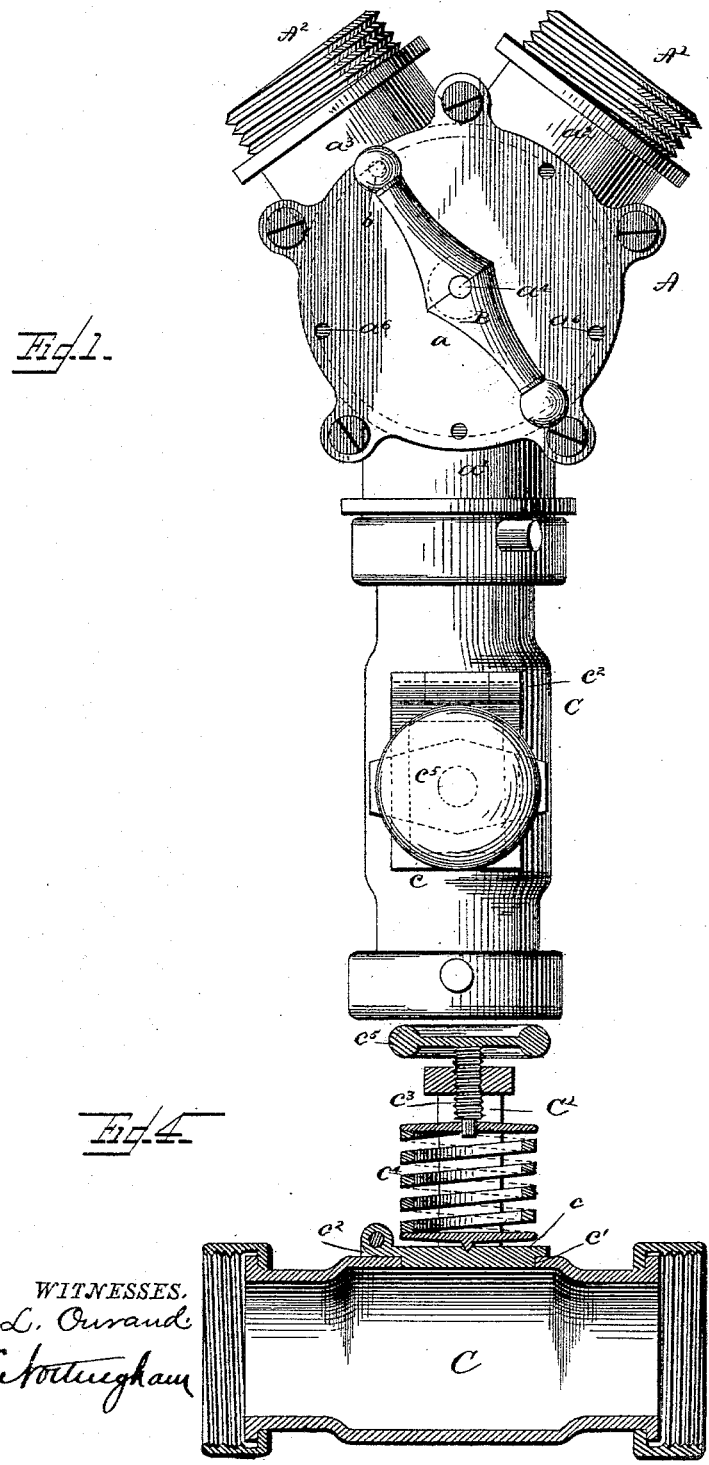

(No Model.) 2 Sheets—Sheet 1.

M. W. WEBB.
HOSE CONNECTION.

No. 388,748. Patented Aug. 28, 1888.

WITNESSES.
F. L. Durand
S. Nottingham

INVENTOR.
Morton W. Webb.
By L. A. Seymour,
Attorney.

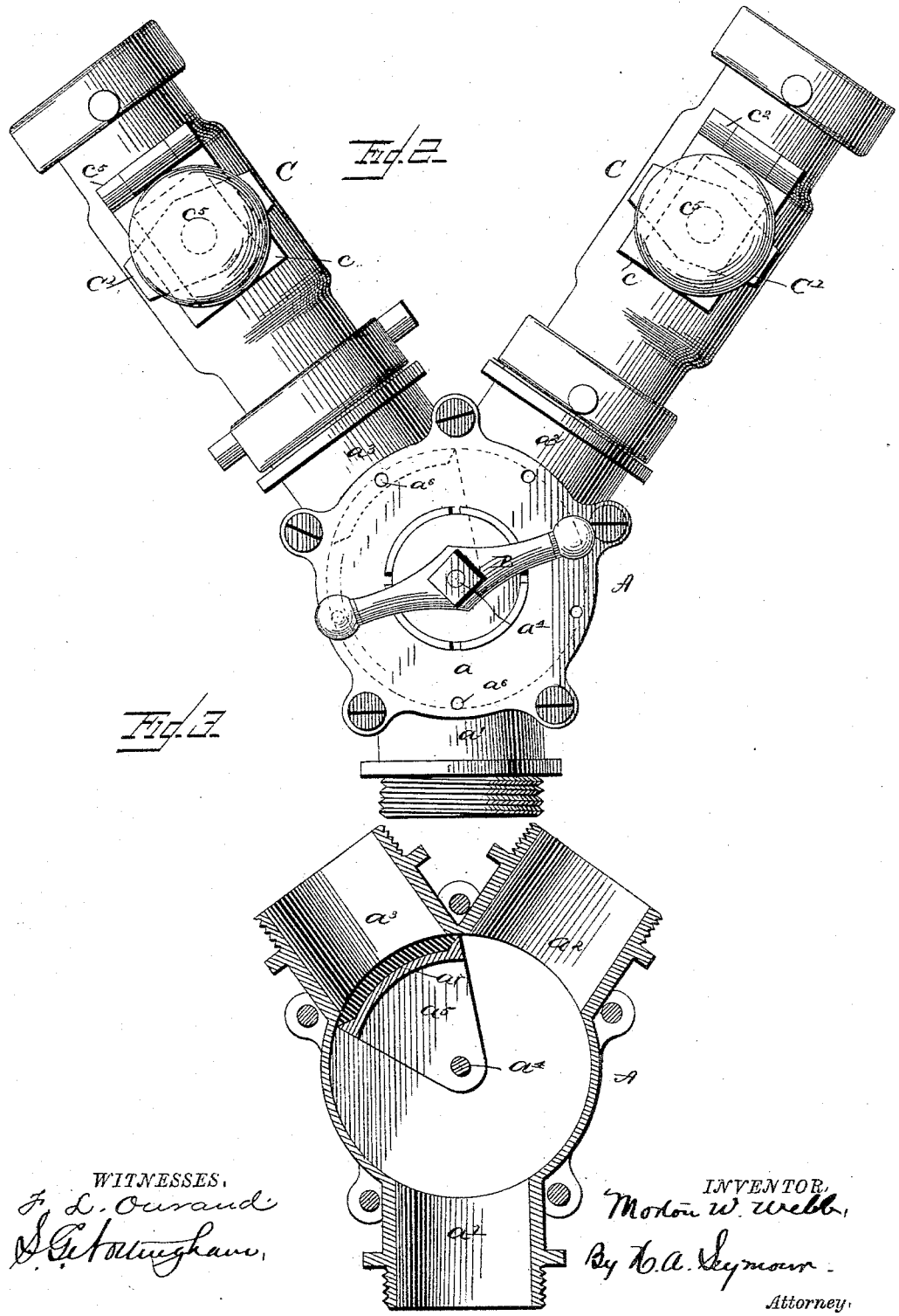

UNITED STATES PATENT OFFICE.

MORTON W. WEBB, OF CHARLESTON, SOUTH CAROLINA.

HOSE-CONNECTION.

SPECIFICATION forming part of Letters Patent No. 388,748, dated August 28, 1888.

Application filed August 6, 1887. Serial No. 246,327. (No model.)

*To all whom it may concern:*

Be it known that I, MORTON W. WEBB, of Charleston, in the county of Charleston and State of South Carolina, have invented certain new and useful Improvements in Hose-Connections; and I do hereby declare the following to be a full, clear, and exact description of the invention, such as will enable others skilled in the art to which it appertains to make and use the same.

My invention relates to the connection of two or more branch lines of hose with the main line leading to a fire-engine; and the object of my invention is to produce a coupling or connection which shall serve to connect two branch lines of hose with the main line to the fire-engine, or to connect the main line to the nozzle with two engines, and which shall be capable of cutting off either or all of the lines without the usual delay.

During the progress of fires long lines of hose frequently have to be laid and the engineer receives frequent orders to stop or decrease the working of his engine, and such orders are often immediately followed by orders to run the engine at full power. Under the present systems these frequent contradictory orders necessitate much waste of time in the transmission of orders from great distances, and serious straining of the engine in repeatedly cooling and heating it in order to accomplish the sudden changes demanded in its operation.

The object of my invention is to remedy these defects; and to this purpose my invention consists in the provision of a valved connection or coupling for uniting several branch lines of hose with a main line, and also in a relief-valve for equalizing the pressure when cutting off one or more of the lines of hose, as hereinafter described and claimed.

In order that my invention may be fully understood, I will proceed to describe it with reference to the accompanying drawings, in which—

Figure 1 is a plan view of my improved connection, showing two branch lines of hose each provided with one of my improved relief-valves. Fig. 2 is a similar view illustrating the position of the relief-valve when the lines of hose are used in "flooding." Fig. 3 is a horizontal sectional view of the connection. Fig. 4 is a vertical sectional view of the relief-valve.

In the said drawings, A designates my improved connection, which is preferably of tubular or cylindrical form, as shown, and is provided with a removable cap, $a$, and three threaded outlets, $a'$ $a^2$ $a^3$, to receive, respectively, the couplings of a main line, A, and two branch lines, A' A².

$a^4$ designates a stem which passes longitudinally through the casing of the connection A, and which carries a V-shaped valve, $a^5$, which extends radially from said stem. One end of the stem is seated in the base of the connection A, and the opposite end of said stem extends through the cap $a$ of said casing.

B designates a handle which is mounted upon the outer or projecting end of the stem $a$, and by means of which said stem is turned. This handle carries a rod or pin, $b$, which, as said handle is turned, enters one or the other of the sockets $a^6$, formed in the upper side of the cap $a$, so that the stem $a^4$ shall be securely held in either of its required positions. The outer edge or margin of valve $a^5$ is curved, as shown at $a^7$, to properly register with the inner surface of the casing $a$ and to properly close the outlets $a'$ $a^2$ $a^3$.

C designates the casing of the relief-valve $c$, said casing being threaded at each end, so as to adapt it to be connected to either of the outlets $a'$ $a^2$ $a^3$, and also with either of the pipes A A' A². This casing is preferably of cylindrical form, and is provided on one side with an orifice or seat, $c'$, for the valve $c$, said valve being hinged upon a divided lug, $c^2$, which is contiguous to the said orifice or seat. C' designates an inverted-U-shaped bracket or frame which rests upon the outer side of the casing C at opposite sides of the seat or orifice $c'$. Through the top of this bracket works a threaded stem, $c^3$, the lower or inner end of which rests upon the upper end of a spiral spring, $c^4$, the lower end of which presses upon the upper side of the valve $c$. The arrangement of this valve and spring is such that by turning the stem $c^3$, by means of a handle or wheel, $c^5$, upon the upper end thereof, the closing pressure of said spring upon valve $c$ shall be varied as desired.

In the arrangement shown in Fig. 1 the engine is supposed to be connected to the outlet $a'$ through the medium of hose-pipe, and the branches $A'$ $A^2$ are supposed to be connected to suitable nozzles. In this arrangement the relief-valve is interposed between the main pipe and the connection A. This arrangement is employed in case of fire. When the engineer receives the order to "slack up" or "stop," instead of "cooling off" his engine, he turns the valve $a^5$ so as to close either the outlet $a^2$ or the outlet $a^3$, or if both streams are to be shut off he turns the valve $a^5$ so as to close the outlet $a'$. In either instance the excess of pressure will cause the valve $c$ to open, so as to discharge water and relieve surplus pressure, and the engine may be kept up at full head of steam temporarily pending the receipt of further orders.

In the arrangement shown in Fig. 2 two engines are supposed to be in use, one being connected to branch $A'$ and the other to branch $A^2$, and the relief-valves are interposed between the connections $A^2$ $A^3$ and the connection A, while the main pipe $A'$ is supposed to lead into a cellar or other flooded portion of a building. By turning valve $a$ either branch pipe $A^2$ $A^3$ or the main pipe $A'$ may be cut off, so as to cut off both branch pipes, and either one or both valves $c$ will open to relieve pressure. Thus great saving in time is effected and all strains upon the engine or engines are avoided by permitting the engines to work at normal pressure with only gradual variations.

Many slight changes might be made in the constructive features of my device without departing from the spirit or exceeding the scope of my invention; hence I do not desire to limit myself to the exact form herein shown; but, Having fully described my invention, what I claim as new, and desire to secure by Letters Patent, is—

1. The combination, with a cylindrical casing having three or more outlets, of a valve revolubly supported in the center of said casing and adapted to close any one of the openings, and a handle for locking said valve over or away from the said openings, substantially as set forth.

2. The combination, with a cylindrical casing having three or more outlets and a removable cap having a series of sockets therein, of a V-shaped valve revolubly supported in the center of said casing and adapted to close any one of the openings, a handle connected with the valve, and a rod or pin in the handle adapted to enter one of the sockets in the removable cap, whereby the valve is locked in position, substantially as set forth.

3. The combination, with a cylindrical casing having three or more outlets, a valve revolubly supported in the center of said casing and adapted to close any one of the openings, and a handle connected with the valve, said handle provided with means whereby the valve is locked, of a pipe connected to said casing and provided with an outlet, a hinged valve for closing said outlet, a spiral spring resting on said valve, and a set-screw for regulating the tension of said spring, substantially as set forth.

4. The combination, with a cylindrical casing having three or more outlets, a removable cap having a series of sockets therein, a V-shaped valve revolubly supported in the center of said casing and adapted to close any one of said openings, and a handle connected with the valve, said handle provided with a pin or similar means adapted to enter the socket in the cap, whereby the valve is locked, of a pipe connected to said casing and provided with an outlet, a hinged valve for closing said outlet, a spiral spring resting on said valve, and a set-screw for regulating the tension of the spring, substantially as set forth.

In testimony whereof I have signed this specification in the presence of two subscribing witnesses.

MORTON W. WEBB.

Witnesses:
HENRY BUIST,
P. EDWIN GREGORY.